United States Patent [19]
Faris

[11] Patent Number: 5,353,247
[45] Date of Patent: Oct. 4, 1994

[54] OPTICAL MASS STORAGE SYSTEM AND MEMORY CELL INCORPORATED THEREIN

[76] Inventor: Sadeg M. Faris, 24 Pocantico River Rd., Pleasantville, N.Y. 10570

[21] Appl. No.: 889,490

[22] Filed: May 27, 1992

[51] Int. Cl.$^5$ .............................................. G11C 13/04
[52] U.S. Cl. .................... 365/108; 369/100; 354/105
[58] Field of Search ..................... 365/108; 369/100; 359/101, 105

[56] References Cited

U.S. PATENT DOCUMENTS

| | | | |
|---|---|---|---|
| 3,703,331 | 11/1972 | Goldmacher et al. | 365/108 |
| 3,821,720 | 6/1974 | Greubel et al. | 365/108 |
| 3,943,369 | 3/1976 | Saeva | 365/108 |
| 4,048,628 | 9/1977 | Boswell | 365/108 |

FOREIGN PATENT DOCUMENTS 62-112295 5/1987 Japan .................................. 365/108

OTHER PUBLICATIONS

S. D. Jacobs et al., Journal Of The Optical Society Of America, B, vol. V (XI) pp. 1962-1978 (Sep. 1988).
M. Schadt & J. Funschilling, Society Of Information Displays, SID XC Digest, p. 324 (1990).
"Liquid Crystalline Polysiloxanes For Optical Write-Once Storage" by J. Pinsl et al., Journal Of Molecular Electronics, vol. 3, 9-13 (1987).

*Primary Examiner*—Joseph A. Popek
*Attorney, Agent, or Firm*—Thomas J. Kilgannon, Jr.

[57] ABSTRACT

This application relates to a new read-write optical storage technology which is based on the cholesteric liquid crystal (CLC) polymer property of selective reflection at a characteristic wavelength. Each layer in a multi-layer CLC storage arrangement has a different characteristic wavelength, making it possible to randomly select any layer for reading, writing or erasing. Each layer incorporates a plurality of memory cells, in a write/erase mode, disposed on a dye polymer material or having such dye polymer material integrated into the CLC material such that, in the presence of light and electric or magnetic fields, the molecules of the CLC material are heated and align themselves with the electric or magnetic field. To the extent that the CLC molecules align themselves with a magnetic field normal to the plane of a storage element, electromagnetic energy in the form of light or infrared radiation at a specific wavelength, in a read mode, will be reflected. Any other orientation whether due to the presence of a magnetic or electric field or heating alone will be transparent to any other wavelength and a circular polarization opposite to the polarization of an incident reading beam. Finally, a disk storage system and a multi-layered storage system for reading, displaying and printing stored information are shown to indicate applications of the cholesteric liquid crystal storage technology.

126 Claims, 10 Drawing Sheets

OPTICAL MASS STORAGE SYSTEM AND MEMORY CELL INCORPORATED THEREIN

BACKGROUND OF THE INVENTION

1. Field of the Invention

This invention relates to optical memories which are adapted to store massive amounts of information and which are operable in a read only mode or in a read, write and erase mode. The invention further relates to a storage element which can be accessed on a selective wavelength basis and includes a multiplicity of memory cells which incorporate cholesteric liquid crystal (CLC) materials.

2. Description of Related Art

For over three decades, magnetic disk and tape media have been the dominant mass storage technologies featuring high capacity and low-cost memories. They have been used extensively in mainframes, personal computers and in entertainment as audio and video tape cassettes. Recently, however, the newer optical mass storage technology has begun to seriously challenge the dominance of magnetic media in mainstream applications. Optical mass storage has the advantage of higher capacity, lower cost per bit, removability and relatively higher immunity from accidental erasures by magnetic fields. Indeed, CD-ROMs, laser disks and magneto-optical drives and media have been introduced to the marketplace and have been accepted by users and are presently enjoying a significant growth rate.

In magneto-optical, M-O, technology, information is stored in a magneto-optical layer by changing the direction of the magnetic domain: "up" and "down" representing electrical "1" and "0", respectively. To write "1", a focused write laser beam heats a spot in the M-O material above its Curie temperature (reducing the magnetization to zero) in the presence of a magnetic field (applied by a coil)in the "up" direction, for example. Upon cooling, the magnetization increases from zero to a final value in the "up" direction. To erase or write "0", the above steps are repeated but the magnetic field is applied in the "down" direction, producing magnetization in the "down" direction. The read operation relies on the M-O Kerr effect which is the ability of the M-O material to rotate, by 3°-5°, the polarization of the reading laser beam incident on it. A polarizing beam splitter transmits the incident beam, and upon reflection from the M-O material, directs, toward an analyzer/detector, only the phase shifted (rotated) components of the reflected beam. To read a "1" state, the analyzer is aligned so that it differentially detects the light the polarization of which is phase shifted by the "up" magnetic domain, while it extinguishes the light that is phase shifted by the "down" magnetic domain. Typically, this read operation has good discrimination and a carrier to noise ratio in excess of 50 dB.

This M-O technology is currently enjoying a significant market penetration rate because of its proven higher density than magnetic disk technology and is evolving rapidly to improve its seek time and data rate. This technology faces a wavelength bottleneck that imposes an upper limit on its density, unless a great deal of parallelism is used.

Cholesteric liquid crystals are nematic liquid crystals that have a chiral additive or a side-chain polymer with a polysiloxane backbone. These cholesteric liquid crystal (CLC) materials have cigar shaped molecules which order themselves in an optically active structure in a left-handed or right-handed helix with a helix pitch, P, and have an optical axis which is parallel to the helix axis. CLC materials are described in the following references: S. D. Jacobs et al, Journal of the Optical Society of America, B, VOL. V (XI) pages 1962–1978 (September, 1988); M. Schadt and J. Funschilling, Society of Information Displays, SID XC Digest, Page 324 (1990).

To the extent that in CLC materials are known, no prior art is known which incorporates such materials in an optical memory wherein different layers of such materials are stacked and selectively accessed on a wavelength basis. Also, there is no known prior art which shows how memory cells made of cholesteric liquid crystal materials may be reversibly written into and erased so that such memory cells when incorporated into stacked memory elements may be addressed selectively on a wavelength basis.

An article entitled "Liquid Crystalline Polysiloxanes for Optical Write-Once Storage" by J. Pinsl et al, Journal of Molecular Electronics, VOL. 3, 9–13 (1987) shows a CLC storage region into which a material which converts light to heat has been introduced. Then, in a write-once mode of operation, an irreversible destruction of the helical structure of the CLC material takes place destroying the ability of the CLC region to reflect light completely. To the extent that a write-once mode of operation only is suggested, the present invention may be distinguished over the reference in that it does not suggest the reversible write-erase mode in the presence of electric or magnetic fields as does the present application. This should be clear form the article itself which characterizes the write-once operation as "irreversible". Neither does the reference suggest the stacking of storage elements for selection on a wavelength basis.

SUMMARY OF THE INVENTION

This application relates to a new read-write optical storage technology which is applicable to the solution of numerous problems in science and engineering which require powerful computers with Tera-FLOP speeds. Such high speeds demand concurrent availability of mass storage systems with Tera-Byte capacities and data rates exceeding 100 Giga-bits/second. The new technology is based on the cholesteric liquid crystal (CLC) polymer property of selective reflection at a characteristic wavelength. Each layer in a multi-layer CLC storage medium has a different characteristic wavelength, making it possible to randomly select any layer for reading, writing or erasing. Each layer incorporates a plurality of memory cells, in a write/erase mode, disposed on a dye polymer material or having such dye polymer material integrated into the CLC material such that, in the presence of light and electric or magnetic fields, the molecules of the CLC material are heated and align themselves with the electric or magnetic field. To the extent that the CLC molecules align themselves with a magnetic field normal to the plane of a memory cell element, electromagnetic energy in the form of light or infrared radiation at a specific wavelength, in a read mode, will be reflected. Any other orientation whether due to the presence of a magnetic or electric field or heating alone will be transparent to any other wavelengths and circular polarization opposite to the polarization of an incident reading beam. In addition, the application relates to multi-layer systems into which information may be written and from which information may be read and erased. Finally, a disk storage system and a multi-layered storage system for reading, displaying and printing stored information are shown to indicate applications of the cholesteric liquid crystal storage technology.

It is, therefore, an object of this invention to provide a mass storage optical memory.

Another object is to provide a mass storage optical memory which incorporates cholesteric liquid crystal memory cells from which stored information may be read and erased and into which information may be rewritten.

Another object is to provide a mass storage optical memory which is simple to fabricate inexpensive and not subject to the defects of prior art optical memories.

A feature of the present invention is the use of a light absorbing medium which converts light to heat and, in the presence of switchable magnetic or electric fields aligns a cholesteric liquid crystal region in such a way that it is either reflective or transparent to circularly polarized light.

Another feature is the use of a light absorbing medium which is integral with the cholesteric liquid crystal material of a memory cell such that the heat generated in combination with electric or magnetic fields aligns the molecules of the CLC material in the direction of an applied electric or magnetic field.

Another feature is the use of cholesteric liquid crystal information storage elements in a stacked regime. In this regime, storage element of the stack may be selected on a wavelength basis by incorporating CLC materials in each layer so that each layer is responsive to one and only one wavelength. The foregoing and other objects and feature of the present application will become apparent when taken in conjunction with the following drawings.

BRIEF DESCRIPTION OF THE DRAWINGS

FIG. 7 shows the basics of a write operation.

FIG. 8 shows the basics of an erase operation in accordance with the teaching of the present application.

MASS STORAGE APPLICATION

DETAILED DESCRIPTION OF PREFERRED EMBODIMENTS

Figure 1:
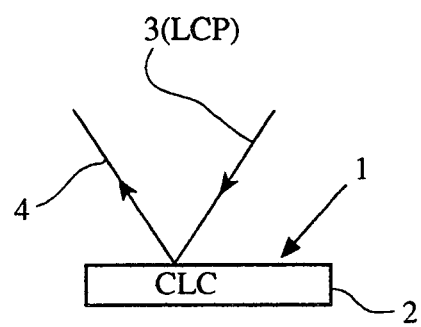
FIG. 1 is a cross-sectional view of a storage region of a memory cell in accordance with the teaching of the present application.

Referring now to FIG. 1 there is shown a cross-sectional view of a storage region or memory cell 1 in accordance with the teaching of the present application. Memory cell 1, as indicated in the discussion of the prior art hereinabove, may consist of a single cholesteric liquid crystal material which is capable of reflecting circularly polarized electromagnetic radiation in the visible or infrared ranges. Cholesteric liquid crystals (hereinafter called CLC) are nematic liquid crystals that have a chiral additive or side-chain polymer with a polysiloxane backbone. The CLC materials have cigar-shaped molecules to spontaneously order themselves in an optically active structure of a left-handed or right-handed helix with a helix pitch, P, and an optical axis which is parallel to the helix axis. CLC materials are described in the following references: S. D. Jacobs et. al, Journal of the Optical Society of America, B, VOL. 5 (9), pages 1962–1978 (September, 1988); M. Schadt and J Funschilling, Society of Information Displays, SID 90 Digest, page 324 (1990); these references are hereby incorporated by reference along with a co-pending Reveo application Ser. No. 07/798,881, filed Nov. 27, 1991, entitled Aligned Cholesteric Liquid Crystal Inks. All of these references discuss the properties of CLC materials in detail. For purposes of the present application, suffice it to say that a CLC layer 2 like that shown in FIG. 1 may be prepared in a well known way with its optical axis perpendicular to the width of layer 2. Layer 2 also has the property that it is reflective to one of two kinds of circularly polarized light. For exemplary reasons, assume that layer 2 is reflective to left-hand circularly polarized light. This property of selective reflection is exhibited by layer 2 when a monochromatic beam of wavelength, λ, propagating along the helix axis satisfies the relationship;

$$\lambda = \lambda_0 = n_a P, \quad (1)$$

Where $n_a$ is the average refractive index of the CLC layer 2 and, P, is its pitch. Unpolarized light with a wavelength $\lambda = \lambda_0$ incident on the film will interact with the helix structure so that 50% of it will be reflected as left-hand circularly polarized light (LCP) and the other 50% will be transmitted as right-hand circularly polarized light (RCP). If the incident light is polarized with pure LCP, it will be reflected 100% and, it will be transmitted 100% if its polarization is in the pure RCP state. The LCP condition is shown in FIG. 1 wherein incident LCP light, as shown by arrow 3, is 100% reflected as shown by arrow 4. Also, it should be appreciated that if the incident radiation has one or more wavelengths that do no not satisfy equation (1) above, then all the radiation is transmitted at any polarization. It is also important to note that this selective reflection polarizing property does not depend on an absorptive mechanism, as is the case with conventional sheet polarizers. As will be shown in what follows, operation of the mass storage arrangement disclosed by the present application also depends on the tuneability of the helix pitch which, in turn, changes the wavelength at which equation (1) is satisfied. The pitch, P and, hence, $\lambda_0$, are tuned by changing the concentration of the included chiral additive in a CLC layer so that equation (1) is satisfied at different wavelengths. This has been demonstrated over a wide spectral range from the visible region to wavelengths of tens of microns. Using an approach which incorporates wavelength tuneability, a plurality of storage regions or memory cells 1 may be incorporated in a single layer such that cells 1 are reflective to left-hand circular polarization (LCP) at a selected wavelength, $\lambda_1$. This can be accomplished in a well-known way by including a proper composition of the CLC material and then utilizing well known photolithographic masking and etching techniques similar to those utilized in the semiconductor fabrication arts. In a similar manner, a plurality of layers 2 maybe fabricated which incorporate a plurality of storage regions or memory cells 1 like that shown in FIG. 1 except that each separate layer 2 is now reflective at a different single wavelength of incident electromagnetic radiation. The plurality of layers 2 may then be formed into a disk-like structure similar to that shown in FIG. 2.

Figure 2:
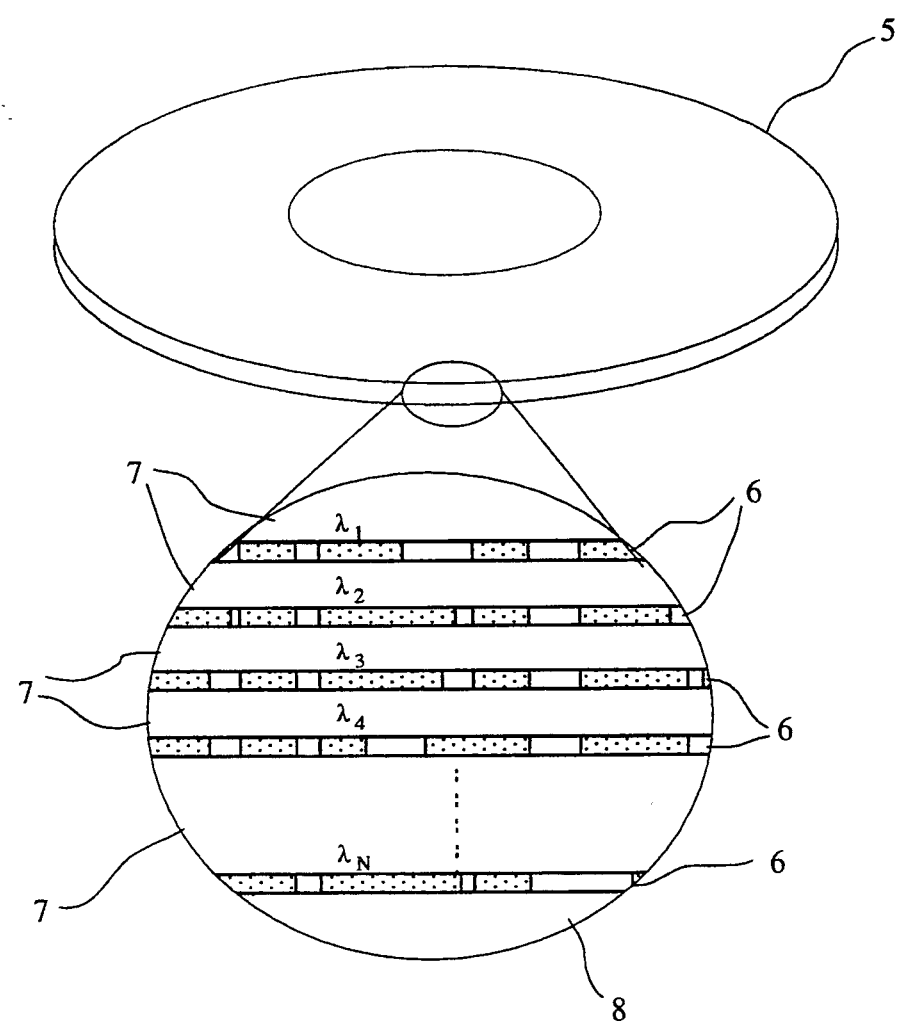
FIG. 2 is a perspective view of a multi-layer optical storage disk with the cross-section of the edge thereof being blow-up to show a plurality of information storage elements spaced from one another by a plurality of transparent plastic layers.

FIG. 2 is a perspective view of a multi-layer optical storage disk 5 with the cross-section of the edge thereof blown-up to show a plurality of information storage elements 6 spaced from one another by a plurality of transparent plastic layers 7.

As shown in FIG. 2, storage disk 5 is made up of a plurality of information storage elements 6 separated one from another by layers 7 of clear plastic all of which are deposited on a polycarbonate or aluminum substrate 8. Each storage element 6 includes a plurality of storage regions or memory cells 1 which have been fabricated to be reflective of left-handed circularly polarized light, for example. Each information storage element 6, however, is reflective at only a single different wavelength of incident light. Thus, each the storage element 6 reflects selectively in accordance with equation (1), when its helix axis (optical axis) is oriented normal to the surface of storage disk 5. As indicated previously, the reflected wavelengths are obtained by use of the appropriate composition additive of the CLC material. For present purposes, the materials from which memory cells 1 are fabricated are solid polymers at room temperature and have glass transition temperatures Tg>75° C. As indicated hereinabove, information is generally written onto a storage element 6 by eliminating the selective reflection property from parts of storage elements 6. This is accomplished by either actually removing part or parts of storage element 6 (write-once-read-many-times, WORM mode) or by orienting the helix axes in those parts parallel to the surface of disk 5 (write/erase mode) as will be described in more detail herein below. Because of the selective reflection property imparted by a different wavelength selectivity for each of storage elements 6, any storage element 6 can be addressed (selected) randomly for reading.

Figure 3:
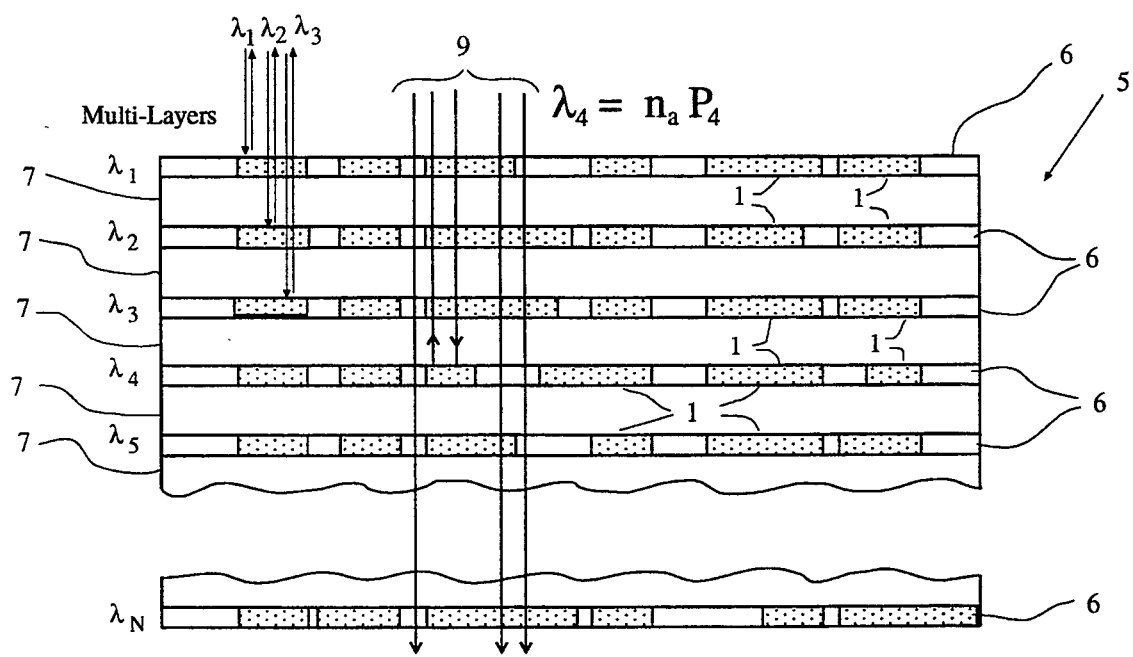
FIG. 3 is a cross-sectional view of a section of a disk similar to that shown in FIG. 2 which illustrates how a storage region or memory cell in an information storage element may be read.

Referring now to FIG. 3 there is shown a cross-sectional view of a section of a disk 5 similar to that shown in FIG. 2 which illustrates how a storage region or memory cell in an information storage element 6 may be read.

FIG. 3 shows a storage disk 5 made up of a plurality of information storage elements 6 which, for purposes of illustration, are also designated as layers $\lambda_1$–$\lambda_N$. A read beam 9 of incident electromagnetic radiation from a radiation source such as a solid state laser (not shown) having an LCP state, is projected at disk 5. Read beam 9 is tuned to a wavelength of $\lambda_4$ and, as such, satisfies equation (1) for the fourth storage element 6 from the top only. As a result, read beam 9 is totally transmitted by all of the top three storage elements 6 and is also transmitted by storage elements 6 below the element 6 tuned to the $\lambda_4$ wavelength. Information storage element 6 tuned to $\lambda_4$, on the other hand, because it satisfies equation (1) reflects beam 9 at the locations where a storage region or memory cell 1 is present representing a digital "one" state and transmits beam 9 at the locations where reflective material has been removed, for example, representing a digital "zero" state. During this read operation, the detection mechanism is simplicity itself; a detector (not shown) detects the presence or absence of a reflected signal as a "1" or "0", respectively. In a preferred mode of operation, N beams 9 are required; one for each information storage element 6. This permits the random reading of any signal storage element 6 or all storage elements 6 in parallel. Obviously, then, the parallel reading of N layers increases the data rate by a factor of N.

Figure 4:
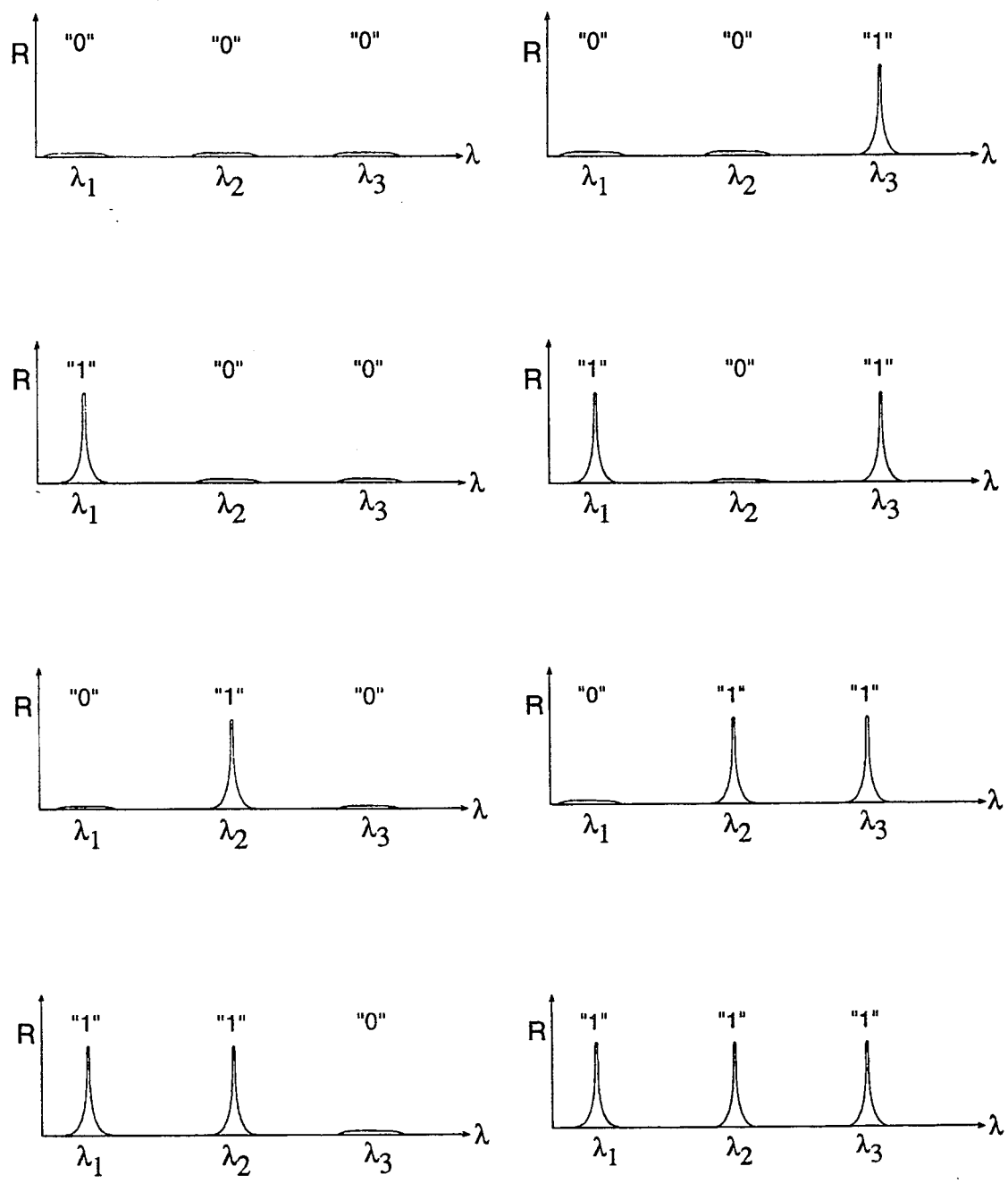
FIG. 4 shows graphical representations of reflection spectra of eight combinations or stored information in a single location on a storage disk using the first three storage elements shown in FIG. 3.

FIG. 4 shows graphical representations of reflection spectra of eight combinations of stored information in a single location on a storage disk using the first three storage elements 6 shown in FIG. 3. In FIG. 3, the top three storage elements 6 are otherwise indicated in that figure by the reference characters $\lambda_1$, $\lambda_2$ and $\lambda_3$. These reference characters indicate that storage regions or memory cells 1 in an associated storage element 6 are reflective at the wavelength indicated and only at that wavelength. Thus, a reading beam 9 at a wavelength of $\lambda_1$ is reflective from the leftmost memory cell 1 of storage element 6 because that memory cell 1 has been fabricated to reflect at that wavelength. Similarly, leftmost storage region or memory cell 1 of storage element 6 otherwise indicated by the reference character $\lambda_2$ is reflective to a beam 9 of light which is tuned to the wavelength $\lambda_2$. Finally, leftmost memory cell 1 of storage element 6 otherwise indicated in FIG. 3 as $\lambda_3$ is reflective at a wavelength $\lambda_3$. When the leftmost memory cells 1 of storage elements 6 otherwise indicated as $\lambda_1$, $\lambda_2$ and $\lambda_3$, are interrogated by three laser beams at wavelengths of $\lambda_1$, $\lambda_2$ and $\lambda_3$, the reflection spectra shown in FIG. 4 may be obtained depending upon whether or not the storage regions or memory cells 1 are reflective or transparent to incident light. Where, for example, leftmost memory cell 1 in each of the three layers is reflective, the reflection spectra shown at the bottom right of FIG. 4 are obtained. When the leftmost storage region or memory cell 1 in each of the three layers is transparent, the reflection spectra shown at the top left are obtained. Further inspection of FIG. 4 shows that six other possible combinations may be obtained by simply interrogating one memory cell 1 in each of the top three storage elements 6. From the foregoing, it should be clear that a large number of information storage elements 6 may be utilized to form a mass storage arrangement. The number of layers or storage elements, N, is determined by the spectral width, $\Delta\lambda$, of selective reflection of each memory cell 1 in that element 6 which is governed by its birefringence $\Delta n = n_e - n_0$ where $n_e$ is the extraordinary index of refraction of the CLC material, and $n_0$ is its ordinary index of refractions. Thus providing;

$$\Delta\lambda = \Delta n \lambda_0 / n_a \qquad (2)$$

Wherein $\lambda_0$ is the wavelengths of incident light and $n_a$ is the average refractive index of the cholesteric liquid crystal material utilized.

To the extent that cholesteric liquid crystal materials are known to exist which can be tuned over a wide spectral range, BW, from 300 nm to 14,000 nm, the number of layers, N, can be arrived at by simply dividing BW into spectral regions which have widths given by equation (2) above with appropriate separations that insure minimum cross-talk between layers. Known cholesteric liquid crystal materials have $\Delta n / n_a = 0.033$, leading to a storage arrangement having a number of layers, $N > 100$.

Up to this point, it has been illustrated how any one or more of N storage elements 6 can be randomly selected for reading without interference from the unselected storage elements 6. Thus far, it has been assumed that storage regions or memory cells 1 are rendered either reflective or transparent during fabrication and stay in the state in which they have been a set during fabrication. This is a write once, read-many-times mode of operation. In what follows, it will be shown how any one or more of N storage elements 6 may be randomly selected for writing and erasing without interference from unselected storage elements 6. To accomplish this, the helix axes of the cholesteric liquid crystal material normal to the surfaces of storage elements 6 or the surface of a disk 5 must be reversibly oriented so that any selected memory cell 1 is reflective or transparent. Thus, if the helix axis of the CLC material is normal to the surface of an information storage element 6, this may represent a digital "1", or, if it is parallel to the surface of an information storage element 6, it may represent a digital "0". Alternatively, a digital "0" may be represented by permitting the molecules of the CLC material to be aligned in random directions. Orienting the helix axis in one of these two mutually orthogonal directions is achieved by means of externally disposed magnetic field generating solenoids which interact with the magnetic moment (permanent or induced) of the cholesteric liquid crystal molecules, which, in turn, adjusts the alignment of the helix axis along the field direction. Alignment of the CLC molecules occurs when the CLC polymer is above its glass transition temperature, Tg. Thus, the helical axis of the CLC material may be reversibly changed from parallel to the optical axis of the CLC material to perpendicular to the optical axis of the CLC material and vice versa. Also the helical axes of the CLC material may be changed from parallel to the optical axis to a random orientation and from the latter state to an orientation parallel to the optical axis of the CLC material. The alignment can also be achieved by means of an electric field as well be shown hereinbelow. For the random access of N cholesteric liquid crystal storage elements 6 in a write/erase mode, an absorptive dye polymer, DP, layer is added to each of the information storage elements 6 as shown in FIG. 5.

Figure 5:
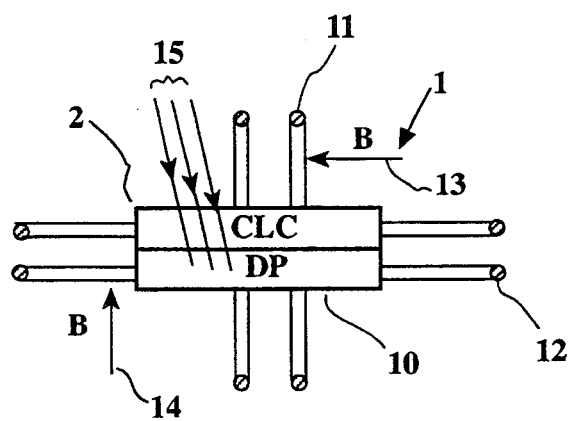
FIG. 5 is a cross-sectional view of a storage region or memory cell which includes a cholesteric liquid crystal (CLC) layer and a dye polymer layer disposed beneath the liquid crystal layer and in contacting relationship with it.

FIG. 5 is a cross-sectional view of a storage region or memory cell 1 which includes a cholesteric liquid crystal (CLC) layer 2 and a dye polymer, DP, layer 10 disposed beneath layer 2 in contacting relationship with layer 2. In addition, FIG. 5 shows a pair of orthogonally disposed solenoid windings 11, 12 which, when energized, provide horizontal and vertical magnetic fields, 13, 14, respectively, which immerse memory cell 1. Initially, the helix axis of the CLC layer 2 may be aligned perpendicular to the surface of layer 2 during fabrication. The use of magnetic fields in conjunction with heating memory cell 1 above its glass transition temperature, Tg, will be discussed hereinbelow in connection with a description of how writing and erasing are carried out.

Figure 6:
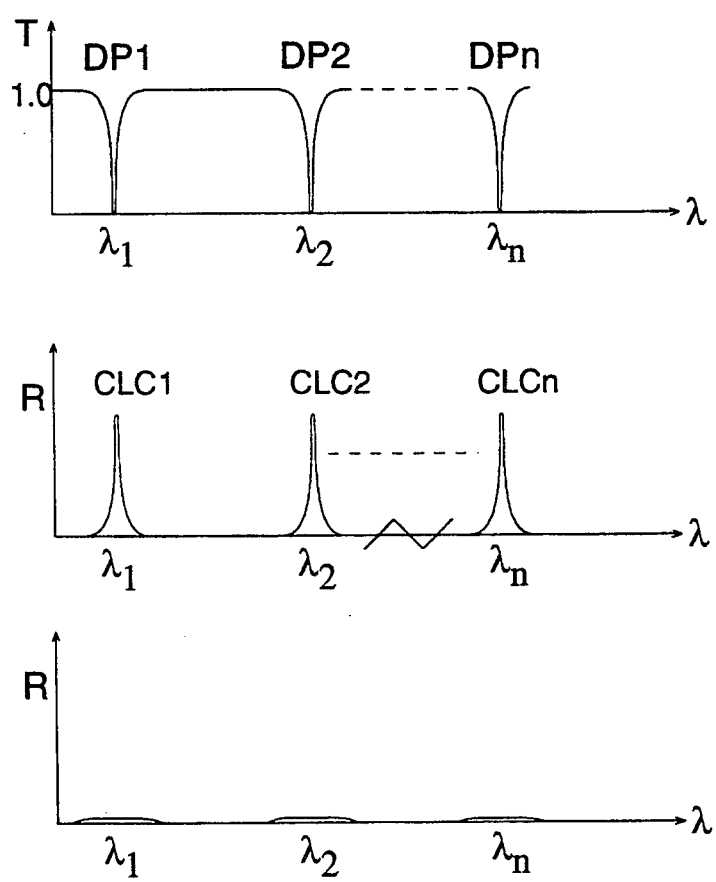
FIG. 6 shows graphical representations of: the absorption spectra of N dye polymer layers; the reflection spectra of N CLC layers with their helix axes aligned along a vertical magnetic field and, the reflection spectra of N CLC layers with their helix axes aligned along a horizontal magnetic field.

Referring now to FIG. 6, there are shown, from top to bottom, graphical representations of: the absorption spectra of N dye polymer, DP, layers; the reflection spectra of N/CLC layers 2 with their helix axes aligned along a vertical magnetic field 14 and, the reflection spectra of N/CLC layers 2 with their helix axes aligned along a horizontal magnetic field 13 or with random alignment of the molecules of the CLC material.

In FIG. 6, the absorption peak of each dye in each dye polymer layer 10 is designed to coincide with the reflection peak of its associated CLC layer 2. Note in the top and the middle graphical representations of FIG. 6 that the absorption peaks DP1, DP2 ... DP$_n$ are coincident with the reflection peaks CLC1, CLC2 ... CLC$_n$ at the same wavelengths $\lambda 1$, $\lambda 2$ ... $\lambda_n$. Thus, the absorption peak of each dye is designed to coincide with the reflection peak of its respective CLC layer 2 as determined by equation (2). The absorption width of a dye polymer layer 10 is $\Delta\lambda_\delta < \Delta\lambda$ given by equation (2). DP layers 10 should have much higher glass transition temperatures, Tg, than those of the CLC polymers such that when a DP layer 10 absorbs sufficient energy to heat a CLC layer 2 which is in contact with it to above its glass transition temperature, the molecules of CLC layer 2 are free to rotate and align themselves in the direction of the applied magnetic field or randomly where no magnetic field is applied. The middle graph, therefore, of FIG. 6 shows the reflection spectra of N/CLC layers 2 with helix axes aligned along a vertical magnetic field 14, for example, indicating where layers 2 are reflecting that digital "1's" have been written. The bottom graphical representation of FIG. 6 shows the reflection spectra of CLC layers 2 with their helix axes aligned along a horizontal magnetic field 13 (or randomly aligned) so that all of layers 2 are nonreflecting indicating that all data has been erased or that all "0's" have been written. Typical examples of dyes useful in dye polymer layers 10 include nondichroic dyes such as Pentachrome Black P.V. (Color Index 170); Rubrex Red (C.I. 163) and Serichrome Blue R (C. I. 180). Dyes suitable for forming light-polarizing images include water-soluble, dichroic dyes such as dyes in the disazo, trisazo, stilbene, thiazole and pyrazalone groups. Such dyes show high dichroism when applied to a properly oriented sheet of a plastic such as polyvinyl alcohol. Other suitable dyes are discussed in detail in U.S. Pat. No. 2,440,105, issued Apr. 20, 1948 and U.S. Pat. No. 4,837,745 issued Jun. 6, 1989 which are hereby incorporated by reference.

Figure 7:
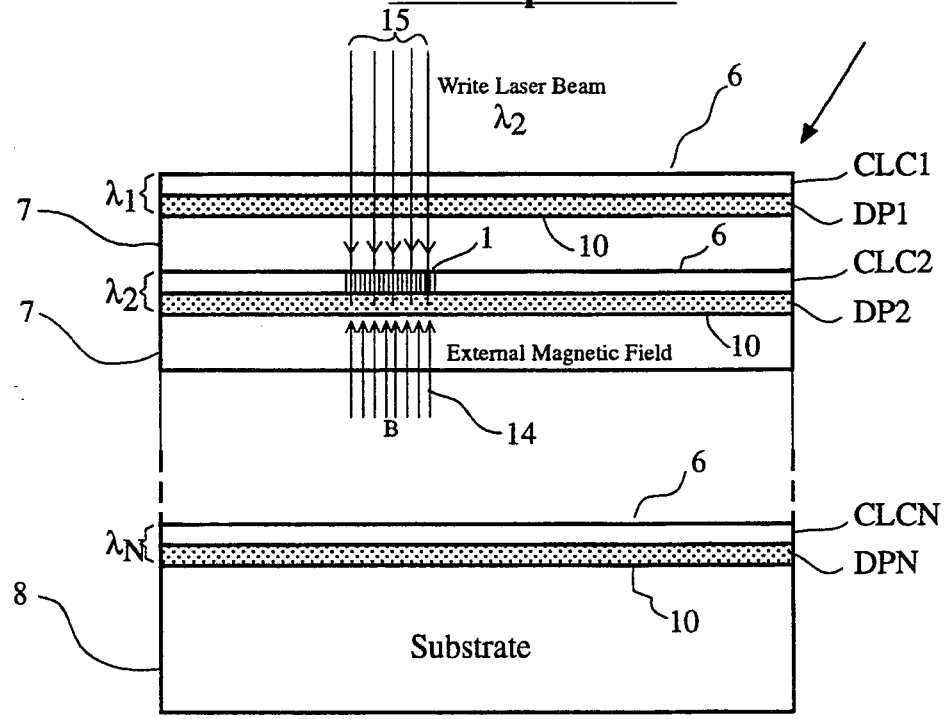
FIG. 7 is a cross-sectional view of a multi-layer storage disk similar to that shown in FIG. 3 except that a dye polymer layer is shown disposed in contacting relationship with an associated information storage element. In addition a write laser beam and a vertical external magnetic field are shown.
Figure 8:
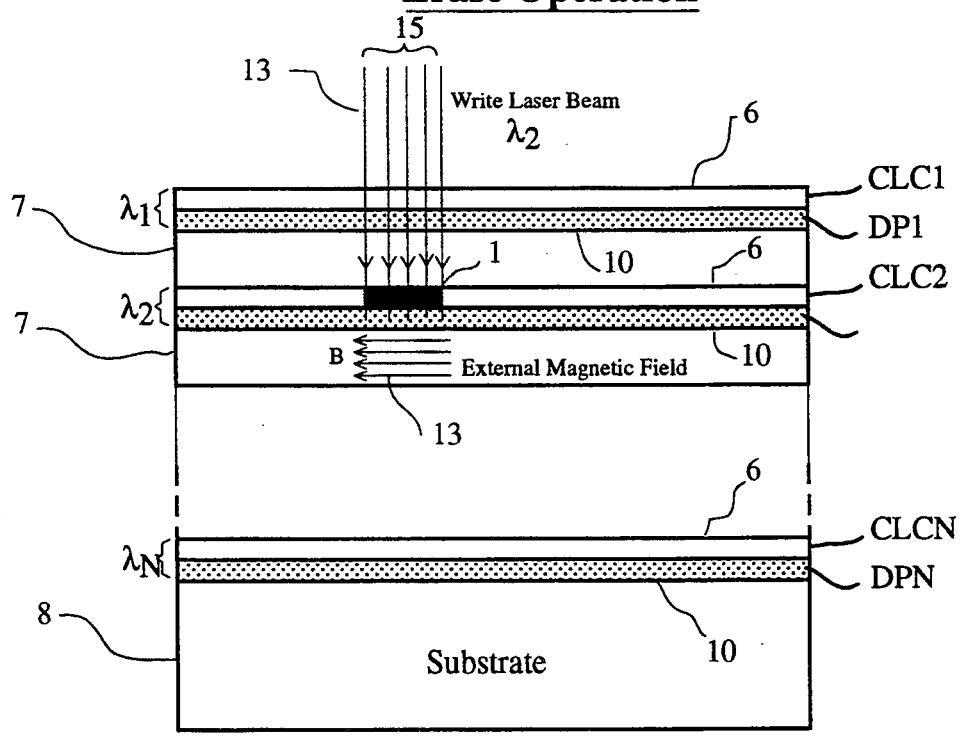
FIG. 8 is a cross-sectional view of a multi-layer storage disk similar to that shown in FIG. 7 except that the external magnetic field is directed in a horizontal direction.

FIG. 7 is a cross-sectional view of a multi-layer storage disk 5 similar to that shown in FIG. 3 except that a dye polymer, DP, layer 10 is shown disposed in contacting relationship with an associated information storage element 6. FIG. 7 illustrates how a storage region or memory cell 1 of any information storage element 6 may be randomly accessed (wavelength addressed or selected) for writing information into a memory cell 1. A write beam 15 which may be from a laser or other appropriate source of electromagnetic energy (not shown) is polarized in the right hand circular polarization (RCP) state which is orthogonal to the left-hand circular polarization (LCP) state of a read beam 9 in FIG. 3 used during a read operation. Write beam 15 is orthogonally polarized to the polarization of a read beam 9 so that write beam 15 can access an underlying dye polymer layer 10. In this instance where information is to be written into a memory cell 1 and cell 1 is already in a reflecting state, it would simply reflect an LCP beam and no portion of it would penetrate to the dye polymer layer 10 underlying a memory cell 1. By making the impinging beam 15 RCP; this difficulty is avoided since storage region or memory cell 1 is reflective to only LCP at that wavelength. Returning to FIG. 7, if a storage region or memory cell 1 of the second information storage element 6 which is tuned to a wavelength of $\lambda_2$ is selected, a write laser beam 15, tuned to the same wavelength is projected at that storage element from a solid state laser (not shown), for example. Assuming that all elements 6 have their memory cells 1 in the digital "0" state initially (they are nonreflecting because their helix axes are aligned in the horizontal direction or the CLC material molecules are randomly aligned) and it is desired to write a digital "1" in a selected memory cell 1 in the second storage element 6, the RCP write beam 15, tuned to $\lambda_2$, is focused onto a spot in the dye polymer layer 10 associated with the second storage element 6. Light beam 15 is then transmitted through the layers CLC1, DP1, and CLC2 without any absorption and is then totally absorbed by that portion of dye polymer layer (DP2) 10 associated with element 6 underneath the selected memory cell 1. The resulting increase in temperature of the portion of dye polymer layer 10 underneath memory cell 1 raises the temperature of the cholesteric liquid crystal material of memory cell 1 above its glass transition temperature, Tg. As indicated hereinabove, when the cholesteric liquid crystal material is heated above its glass transition temperature, the cholesteric liquid crystal molecules are free to rotate and will align themselves in the direction of an applied magnetic or electric field. In the present instance, the application of a vertical magnetic field 14 causes the helix axes of the molecules of the cholesteric liquid crystal material, at that spot, to be aligned with vertical magnetic field 14 which is perpendicular to the surface of disk 5. Upon removal of write beam 15, the molecules of the cholesteric liquid crystal material are effectively frozen in the vertical direction and, hence, memory cell 1, at that spot, becomes a selective reflector of a left-hand circularly polarized (LCP) read beam 9 at a wavelength $\lambda_2$. To erase the same memory cell 1 or write a "0", the above procedure is repeated except for the application of a horizontal magnetic field 13 which is parallel to the surface of disk 5. The erasure of a memory cell 1 like that shown in FIG. 7 is illustrated in FIG. 8. In FIGS. 7 and 8, horizontal and vertical magnetic fields 13, 14, respectively, are applied by solenoids (not shown) which immerse the whole of disk 5 in the appropriately aligned magnetic field. By applying relative motion between disk 5 and the sources of beams 9, 15, all the memory cells 1 of the second layer of cholesteric liquid crystal material may be written/erased. Also, by selecting different wavelengths other elements 6 or all elements 6 may be addressed simultaneously for the write and erase operations illustrated in FIGS. 7, 8. Of course, once the desired information has been written or erased, the information stored in the memory cells 1 of the various storage elements 6 may be read by a reading beam or beams 9 from one or more elements 6. Also, to the extent that heating of a region of a DP layer 10 causes the molecules of an overlying memory cell 1 to become randomly aligned, no magnetic field is required to place a cell 1 in a nonreflecting state.

Storage disk 5 maybe fabricated by simply depositing storage elements 6 made of cholesteric liquid crystal material such as a side-chain polymer with polysiloxane back-bone similar to those described in U.S. Pat. No. 4,410,570, on a polycarbonate or aluminum substrate 8 and spaced apart by transparent polymer layers 7 as shown in FIG. 2. The two layers 6, 7 may be alternately deposited one on top of the other until the desired number of storage elements 6 are obtained. Storage elements 6 may be formed into disks 5 having single or double sides. Using a double sided fourteen inch disk 5, for example, and having one-hundred storage elements per side, such a disk 5 is capable of storing one TeraByte of information. In conjunction with a drive motor having a velocity of 4800 rpm, this disk would have a 5 Gigabit/second data rate with parallel addressing of storage elements 6.

Figure 9:
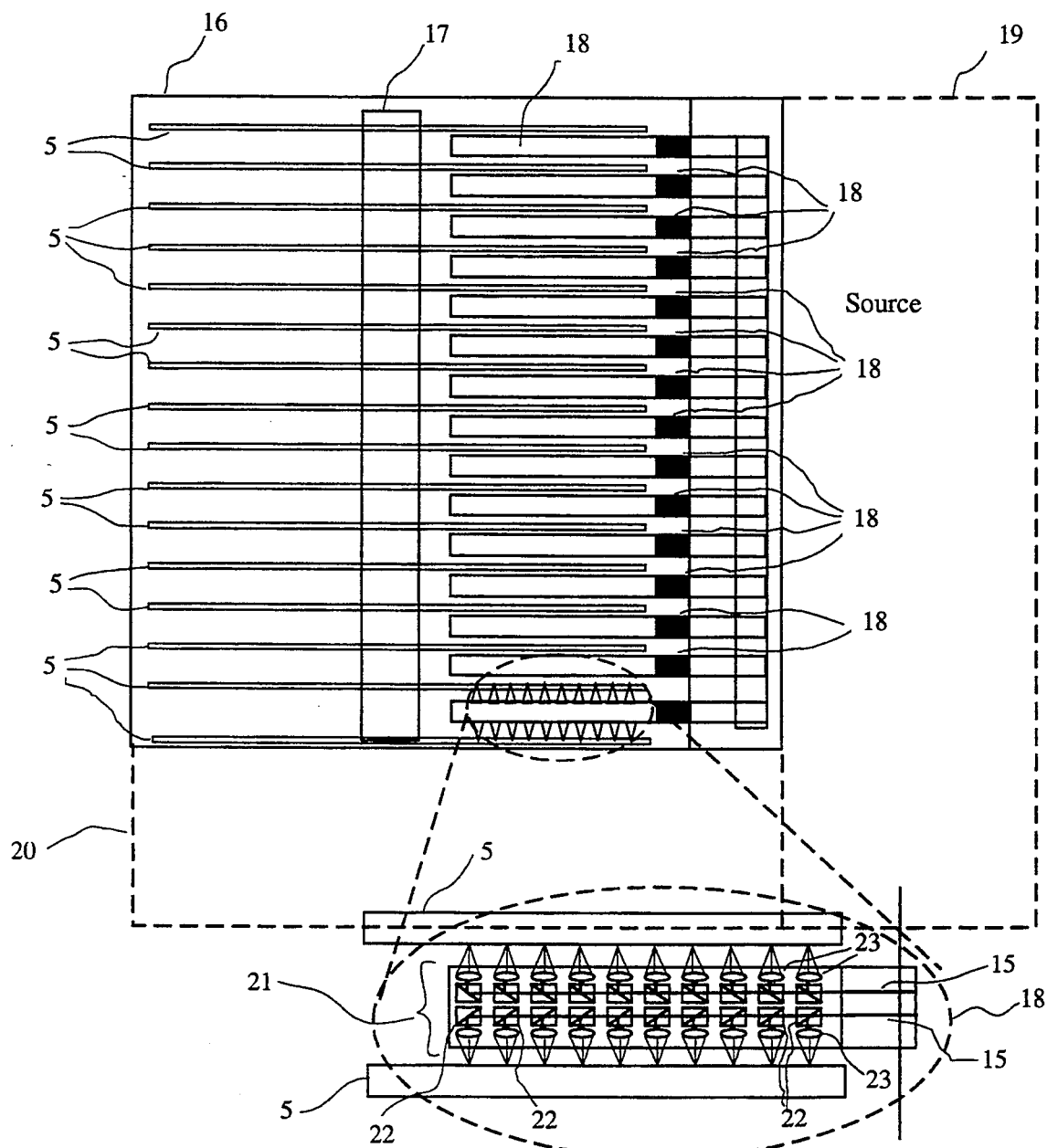
FIG. 9 shows a block diagram of a mass storage system which includes sixteen double sided disks mounted on a single motor driven shaft. The blown-up portion shows how read, write/erase optical heads may be arranged in conjunction with disks to achieve those functions.

FIG. 9 shows a block diagram of a mass storage system which includes 16 double sided disks 5 mounted on a single motor driven shaft. A blown up portion of FIG. 9 shows how read, write/erase optical heads may be arranged in conjunction with disks 5 to achieve those functions.

Before considering FIG. 9 in more detail, it should be appreciated that each of disk 5 in FIG. 9 comprises two-hundred layers of cholesteric liquid crystal material 2 forming one-hundred storage elements 6 on each side of a disk 5. Also, it should be appreciated that a dye polymer layer 10 is associated with each storage element 6 and that each combination of storage element 6 and dye polymer layer 10 is tuned to a different wavelength. Referring now to FIG. 9 in more detail, a block 16 is shown having sixteen storage disks 5 mounted on a motor driven disk shaft 17. An optical head assembly 18 is shown disposed between pairs of disks 5. Each optical head assembly 18 is fed from a dashed-line source block 19 which includes lasers, detector electronics, controllers and the like which are required to carry out the read, write/erase functions of the mass storage system. None of these elements are shown in FIG. 9 but these elements will be dealt with in some detail in what follows hereinbelow. A dashed-line block 20 in FIG. 9 includes a drive motor and its associated electronic circuitry (not shown) which is used to drive disk shaft 17 in a manner well known to those skilled in the disk drive arts. Optical head assembly 18 shown in a blown-up portion in FIG. 9 includes ten heads 21 which, in turn, include mirrors 22 and lenses 23 which focus write/erase laser beams 15, for example, onto the appropriate storage element 6 of disk 5 by appropriately tuning the lasers of block 19. Up to ten wavelengths for each laser source are available so that all of the two-hundred elements 6 of disk 5 may be selected on a wavelength basis. Thus, any storage element 6 may be selected on a wavelength basis and the memory cells 1 thereof may be either written or erased. From the foregoing, it should be clear that using lower power reading beams 9 in conjunction with solid state detectors, memory cells 1 of a storage element 6 may be read-out on a wavelength selective basis. The system of FIG. 9 can have a sixteen Tera-Byte capacity and a five giga-bit per second data rate. Using the system of FIG. 9, if one were to read all thirty-two sides of disks 5 in parallel using optical head assemblies 18 which have ten read/write heads 21 per surface for each of the one-hundred wavelengths required, the ultimate read data rate of 1.6 Tera-bit/s and write data rate of 48 Giga-bit/second can be achieved. This level of performance is totally compatible with future Tera-FLOPS super-computers. In connection with FIG. 9, block 19 was indicated herein above as containing lasers or other appropriate sources of electromagnetic radiation. For illustrative purposes, heads 21 and FIG. 9 were shown to include mirrors 22 and lenses 23 to apply write/erase beams 15 to rotating disks 5, each of which include one-hundred storage elements 6 and their associated dye polymer layers 10. In an actual system, ten lasers, each tunable to ten separate wavelengths, would be required to selectively access each of information storage elements 6 which include a multiplicity of memory cells 1. In what follows, optical head assembly 18 including laser light sources for projecting reading beams 9 and write/erase laser beams 15 will be discussed in some detail.

Optical head assemblies 18, in an operational system, would obtain multiple wavelengths from a series of semiconductor diode lasers. The choice of such semiconductor lasers is based on several factors including; current modulation capability at high frequencies, compactness, high electrical-to-optical conversion efficiency, low cost, wide range of available wavelengths, and ease of wavelength tunability. The outputs of the multiple lasers are either used directly, i.e. at their emission (fundamental) wavelengths or frequency-doubled in suitable non-linear media. It is estimated that an output power of 5 mW at each wavelength is sufficient for writing/erasing in a cholesteric liquid crystal layer 2 in a mass storage system like that shown in FIG. 9. It is further estimated that the reading power requirement will be significantly lower, requiring about 0.5 mW at each wavelength.

Semi-conductor lasers are commercially available at numerous wavelengths from several manufacturers. Currently, commercially available semiconductor lasers span the wavelength range from 0.67 $\mu$m to 1.55 $\mu$m, with the largest selection being in the 0.7–0.79 $\mu$m range. Table 1 below shows the wavelengths and output powers of commercially available semi-conductor lasers from Melles Griot, Irvine, Calif.

TABLE 1

| Wavelength (nm) | Output Power (mW) |
| --- | --- |
| 665 | 5 |
| 670 | 3 |
| 675 | 10 |
| 750 | 5 |
| 780 | 30 |
| 810 | 40 |
| 830 | 40 |
| 840 | 100 |
| 1310 | 25 |
| 1550 | 15 |

Figure 10:
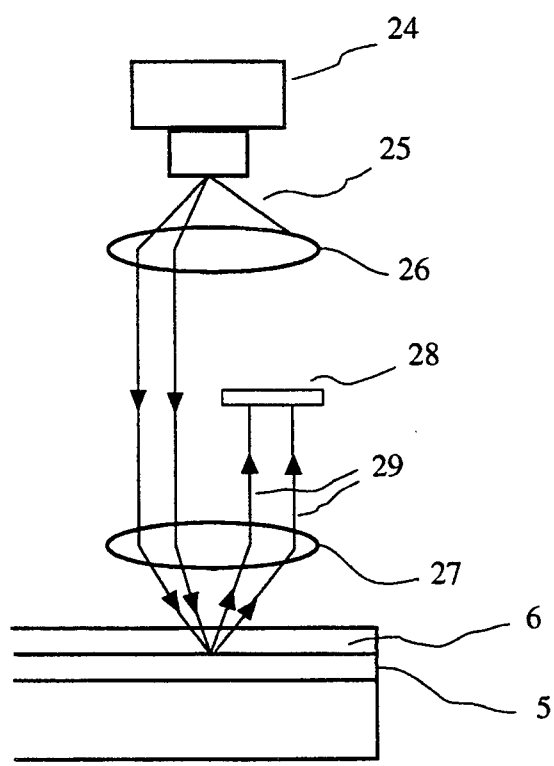
FIG. 10 is a schematic diagram of a simplified optical head utilized in the practice of the present application.

Wavelengths shorter than those listed in Table 1 may be obtained by frequency-doubling techniques. The output of a conventional diode laser can be either frequency-doubled directly in a suitable non-linear medium or, the diode laser may be used to pump a near infrared solid-state laser which may then be frequency-doubled to produce a blue-green output. From the foregoing, it should be clear that there is no dearth of commercially available lasers which are suitable for incorporation in a system like that shown in FIG. 9. Such lasers may be incorporated into optical head assemblies 18 which will also incorporate thermo-electric cooling for the laser, and an optical system for collimating and circularizing the normally elliptical diode laser beam. Optical head assemblies 18 will also incorporate focusing optics and, optics to collect and detect the light reflected from a disk 5. In addition, in a practical system, means are incorporated for servo tracking of bit tracks as well as means for generating an error signal to be used for auto-focusing. To the extent that the reading function in the present application is based upon ordinary reflection from a cholesteric liquid crystal layer 2 rather than by polarization rotation by a small angle, for example, it can be significantly simpler than known prior art approaches. FIG. 10 shows such a simplified optical head.

FIG. 10 is a schematic diagram of a simplified optical head 18 utilized in the practice of the present invention. In FIG. 10 a diode laser 24 provides an output beam 25 which is ultimately focused via collimating lens 26 and objective lens 27 onto a storage element 6 which is disposed in a disk 5. A solid state detector 28 collects reflected light from a memory cell 1 disposed in information storage element 6. As shown in FIG. 10, half of the incident beam 25 illuminates a memory cell 1 and, the reflected light 29, traveling in one-half of the light cone, is detected by detector 28 disposed in the path of the reflected light. The simplicity of optical head assembly 18 as shown in FIG. 10 makes the massive level of parallelism discussed above not only feasible but also affordable. Although all of the optical components required are conventional elements used in various optical storage systems as well as in other optical applications, care must be exercised in selecting their quality as well as in aligning them. For example, where beam splitting is utilized, the optical components in the laser path prior to a beam splitter determine the quality of collimation and circularization of the laser beam. The objective lens determines how small a readable bit on a disk can be and how well it may be read. For defraction limited performance, a sub-micron bit size and an approximately 8 mm diameter collimated laser beam the objective lens must have a numerical aperture $\geq 0.5$ and a focal length of approximately 8 mm.

In another embodiment in accordance with the teaching of the present invention, dye polymer layer 10 may be dispensed with and the light absorbing material may be incorporated into a cholesteric liquid crystal layer 2 forming an integral memory cell and radiation absorbing structure.

Figure 11:
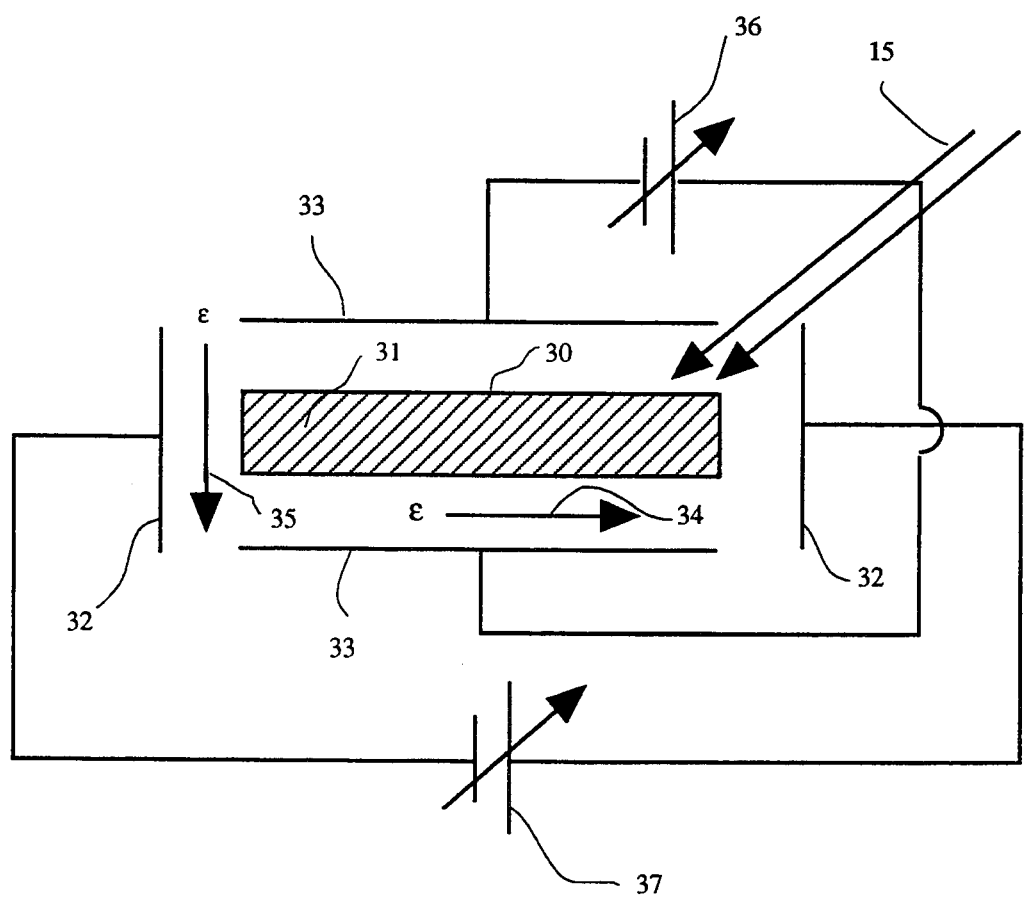
FIG. 11 shows a cross-sectional view of a cholesteric liquid crystal layer similar to that shown in FIG. 1 except that FIG. 11 contains a light absorbing dye polymer material like that utilized in the dye polymer layer of FIG. 5. Also, instead of magnetic field generating solenoid, electric field generating electrodes are shown in FIG. 11 which apply orthogonal electric fields during write/erase operations.

FIG. 11 shows a cross-sectional view of a cholesteric liquid crystal layer similar to that shown in FIG. 1 except that it now contains a light absorbing dye polymer material like that utilized in the dye polymer layer 10 of FIG. 5.

In FIG. 11, cholesteric liquid crystal layer 30 is made from the same materials described hereinabove in connection with layer 2 of FIG. 1. Cross hatching 31 in FIG. 11 illustrates that a dye polymer material, DP, like that incorporated in dye polymer layer 10 of FIG. 5 is now incorporated directly into cholesteric liquid crystal layer 30. To the extent that the molecules of cholesteric liquid crystal layer 30 are oriented in a direction perpendicular to the surface of layer 30, an impinging left hand circularly polarized beam of electromagnetic radiation will be reflected from the surface of layer 30 in the same manner as described hereinabove in connection with the reflection of left-hand circularly polarized light from layer 2 in FIG. 1. When, however, a write/erase beam 15 impinges on cholesteric liquid crystal layer 30 of FIG. 11, the impinging electromagnetic radiation is absorbed by the dye polymer material disposed therein heating the cholesteric liquid crystal material above its glass transition temperature so that the molecules thereof are free to orient themselves in the direction of an applied magnetic or electric field. In this regime, write/erase beam 15 is right-hand circularly polarized so that the impinging light can penetrate to the light absorbing material 31 when the molecules of the CLC layer 30 are oriented so that they reflect left-hand circularly polarized light. Thus, writing and erasing are carried out in substantially the same manner as described in connection with FIG. 5 except that dye polymer layer 10 is no longer required inasmuch as the light absorbing material 31 is now integral with the CLC material of layer 30. Suitable materials useful in the embodiment include a cholesteric liquid crystalline polysiloxane having carbon black disposed therein in a concentration in a range of 0.5% to 1% and a cholesteric liquid crystalline polysiloxane having approximately 10% benzophenone disposed therein. The structure of FIG. 11 which is basically a memory cell 1 is incorporated into a storage element 6 and the latter is stacked with other storage elements 6 to form a multi-layer structure into which information can be written and from which information can be read and erased.

In FIG. 11, pairs of electrodes 32, 33 for generating horizontal and vertical electric fields 34, 35, respectively, have been substituted for solenoids 11, 12 of FIG. 5. The molecules of a CLC material, once heated above the glass transition temperature, will align themselves with an electric field in the same manner as they align themselves with horizontal/vertical magnetic fields. Thus, a horizontal electric field will align CLC molecules horizontally and allow transmission of incident electromagnetic radiation, while, a vertical electric field will align CLC molecules vertically causing reflection of incident electromagnetic radiation. To the extent that heating above the glass transition temperature will randomize the alignment of the CLC molecules in layer 30 and make it nonreflective, a horizontal electric field is not necessary to align CLC molecules horizontally.

Thus, electrode 32 may be eliminated. In a practical situation, this is fortunate, for impractically large voltages would be required to provide an electric field across a fourteen inch disk.

In a typical arrangement, voltage sources 36, 37 would be capable of applying voltage gradients in the range of $10^5$ V/cm–$10^6$ V/cm to memory cell 30. Such voltage gradients, of course, depend on the number of storage elements in a disk among other things so that voltage sources 36, 37 in a range of 1,000–25,000 V are required.

Figure 12:
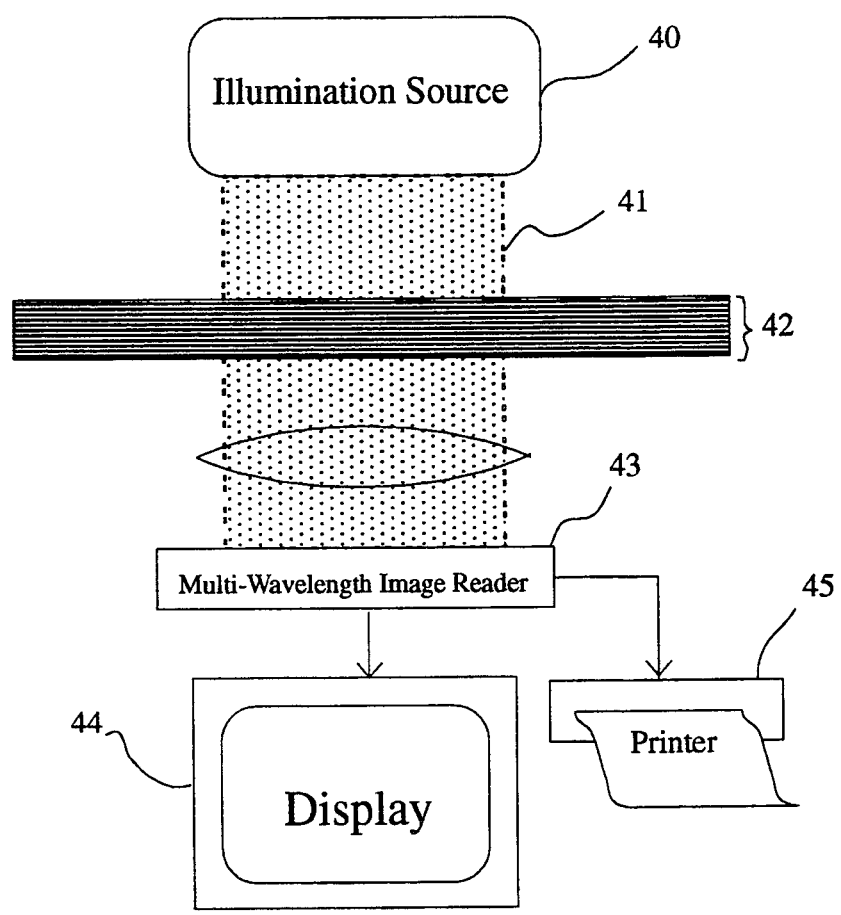
FIG. 12 shows a partially schematic, partially blocked diagram of a mass storage system which is adapted to display high resolution images in color or black and white. In addition, a selected image can be read out to provide a hard copy of the desired image.

In FIG. 12, an illumination source 40 which may contain a plurality of tunable lasers projects radiant energy 41 at a stack of storage elements 42. Elements 42 are similar to storage elements 6 and may store printed information and/or pictures relating to a specific subject. The information may be formed on CLC layers using well-known photolithographic and etching techniques. Each of elements 42 is tuned to a different single wavelength so that information my be selectively retrieved when light at that single wavelength is projected from source 40. To the extent that portions of the selected storage element 42 reflect at the selected wavelength, portions of the projected light are reflected and portions are transmitted. The transmitted portions are detected by a broadband sensor 43 such as a broadband CCD or an image intensifier which accepts broadband inputs. Outputs from sensor 43 may be fed to a video display 44 or to a printer 45 to produce a hard copy of the stored information. Information stored in storage elements may be analog or digital information. If it is digital, D-to-A converters may be interposed between sensor 43 and display 44 and printer 45.

What is claimed is:

1. An optical memory comprising an information storage element which includes a plurality of information storage regions at least one of which, in one mode, causes a reflection of incident circularly polarized electromagnetic radiation of a given wavelength and, in another mode, transmits electromagnetic radiation, and, means associated with said storage element for reversibly switching said at least one of said storage regions between said modes.

2. An optical memory according to claim 1 further including means for detecting a reflection from said at least one of said storage regions.

3. An optical memory according to claim 1 further including means for projecting said incident circularly polarized electromagnetic radiation at said information storage element.

4. An optical memory according to claim 1 further including means for selecting said at least one of said storage regions.

5. An optical memory according to claim 1 further including means for detecting a reflection from said at least one of said storage regions and means for projecting said incident circularly polarized electromagnetic radiation to said information storage element.

6. An optical memory according to claim 1 further including means for detecting a reflection from said at least one of said storage regions, and, means for selecting said at least one of said storage regions.

7. An optical memory according to claim 1 further including means for projecting said incident circularly polarized electromagnetic radiation at said information storage element, and, means for selecting said at least one of said storage regions.

8. An optical memory according to claim 1 further including means for detecting a reflection from said at least one of said storage regions, means for projecting said incident circularly polarized electromagnetic radiation at said information storage element, and, means for selecting said at least one of said storage regions to optically respond to one of said detecting and projecting means.

9. An optical memory according to claim 1 wherein said given wavelength of electromagnetic radiation is in the visible range.

10. An optical memory according to claim 1 wherein said given wavelength of electromagnetic radiation is in the range of 300 nm to 14,000 nm.

11. An optical memory according to claim 1 wherein said circular polarization of incident electromagnetic radiation is right-hand circularly polarized.

12. An optical memory according to claim 1 wherein said circular polarization of incident electromagnetic radiation is left-hand circularly polarized.

13. An optical memory according to claim 1 wherein said information storage element is a member in which said information storage regions are disposed.

14. An optical memory according to claim 1 wherein said information storage element further includes a support substrate on which said information storage regions are disposed.

15. An optical memory according to claim 1 wherein each of said storage region is a cholesteric liquid crystal region.

16. An optical memory according to claim 1 wherein said means for switching includes an electromagnetic radiation absorbing medium disposed in thermally conductive contact with a surface of said information storage element.

17. An optical memory according to claim 1 wherein said means for switching includes means for immersing said storage element in field and aligning said field in one of two mutually orthogonal directions.

18. An optical memory according to claim 1 wherein said means for switching includes means for immersing said storage element in a magnetic field and aligning said magnetic field in one of two mutually orthogonal directions.

19. An optical memory according to claim 1 wherein said means for switching includes means for immersing said storage element in an electric field and aligning said electric field in one of two mutually orthogonal directions.

20. An optical memory according to claim 1 wherein said means for switching includes another means for projecting circularly polarized electromagnetic radiation of said given wavelength of a circular polarization opposite to that of said incident circularly polarized electromagnetic radiation at said information storage element.

21. An optical memory according to claim 1 wherein said means for switching includes means for selecting said at least one of said storage regions.

22. An optical memory according to claim 1 wherein said means for switching includes a radiation absorbing medium disposed in thermally conductive contact with a surface of said information storage element and switchable means for immersing said storage element in a field and aligning said field in one to two mutually orthogonal directions.

23. An optical memory according to claim 1 wherein said means for switching includes a radiation absorbing medium disposed in thermally conductive contact with a surface of said information storage element and switchable means for immersing said storage element in a magnetic field and aligning said magnetic field in one of two mutually orthogonal directions.

24. An optical memory according to claim 1 wherein said means for switching includes a radiation absorbing medium disposed in thermally conductive contact with a surface of said information storage element and switchable means for immersing said storage element in an electric field and aligning said electric field in one of two mutually orthogonal directions.

25. An optical memory according to claim 1 wherein said means for switching includes an electromagnetic radiation absorbing medium disposed in thermally conductive contact with a surface of said information storage element, and, means for projecting circularly polarized electromagnetic radiation of said given wavelength of a circular polarization opposite to that of said incident circularly polarized electromagnetic radiation at said information storage element.

26. An optical memory according to claim 1 wherein said means for switching includes an electromagnetic radiation absorbing medium disposed in thermally conductive contact with a surface of said information storage element, and, means for selecting said at least one of said storage regions.

27. An optical memory according to claim 1 wherein said means for switching includes a radiation absorbing medium disposed in thermally conductive contact with a surface of said information storage element, switchable means for immersing said storage element in a field and aligning said field in one of two mutually orthogonal directions and, means for projecting said incident circularly polarized electromagnetic radiation at said information storage element.

28. An optical memory according to claim 1 wherein said means for switching includes a radiation absorbing medium disposed in thermally conductive contact with a surface of said information storage element, switchable means for immersing said storage element in a magnetic field and aligning said magnetic field in one of two mutually orthogonal directions, and, means for projecting said incident circularly polarized electromagnetic radiation at said information storage element.

29. An optical memory according to claim 1 wherein said means for switching includes a radiation absorbing medium disposed in thermally conductive contact with a surface of said information storage element, switchable means for immersing said storage element in an electric field and aligning said electric field in one of two mutually orthogonal directions and, means for projecting said incident circularly polarized electromagnetic radiation at said information storage element.

30. An optical memory according to claim 1 wherein said means for switching includes an electromagnetic radiation absorbing medium disposed in thermally conductive compact with a surface of said information storage element, means for immersing said storage element in a field and aligning said field in one of two mutually orthogonal directions, and, means for selecting said at least one of said storage regions.

31. An optical memory according to claim 1 wherein said means for switching includes an electromagnetic radiation absorbing medium disposed in thermally conductive contact with a surface of said information storage element, means for immersing said storage element in a magnetic field and aligning said magnetic field in one of two mutually orthogonal directions, and, means for selecting said at least one of said storage regions.

32. An optical memory according to claim 1 wherein said means for switching includes an electromagnetic radiation absorbing medium disposed in thermally conductive contact with a surface of said information storage element, means for immersing said storage element in an electric field and aligning said electric field in one of two mutually orthogonal directions, and, means for selecting said at least one of said storage regions.

33. An optical memory according to claim 1 wherein said means for switching includes an electromagnetic radiation absorbing medium disposed in thermally conductive contact with a surface of said information storage element, means for projecting circularly polarized electromagnetic radiation of said given wavelength of a circular polarization opposite to that of said incident circularly polarized electromagnetic radiation at said information storage element, and, means for selecting said at least one of said storage regions.

34. An optical memory according to claim 1 wherein said means for switching includes an electromagnetic radiation absorbing medium disposed in thermally conductive contact with a surface of said information storage element, means for immersing said storage element in a field and aligning said field in one of two mutually orthogonal directions, means for projecting circularly polarized electromagnetic radiation of said given wavelength of a circular polarization opposite to that of said incident circularly polarized electromagnetic radiation at said information storage element, and, means for selecting said at least one of said storage regions.

35. An optical memory according to claim 1 wherein said means for switching includes an electromagnetic radiation absorbing medium disposed in thermally conductive contact with a surface of said information storage element, means for immersing said storage element in a magnetic field and aligning said magnetic field in one of two mutually orthogonal directions, means for projecting circularly polarized electromagnetic radiation of said given wavelength of a circular polarization opposite to that of said incident circularly polarized electromagnetic radiation at said information storage element, and, means for selecting said at least one of said storage regions.

36. An optical memory according to claim 1 wherein said means for switching includes an electromagnetic radiation absorbing medium disposed in thermally conductive contact with a surface of said information storage element, means for immersing said storage element in an electric field and aligning said electric field and aligning said electric field in one of two mutually orthogonal directions, means for projecting circularly polarized electromagnetic radiation of said given wavelengths of a circular polarization opposite to that of said incident circularly polarized electromagnetic radiation at said information storage element, and, means for selecting said at least one of said storage regions.

37. An optical memory according to claim 1 wherein said means for switching includes an electromagnetic radiation absorbing substance integral with said plurality of information storage region.

38. An optical memory according to claim 1 wherein said means for switching includes an electromagnetic radiation absorbing substance integral with said plurality of information storage regions, and, means for immersing said storage element in a field and aligning said field in one of two mutually orthogonal directions.

39. An optical memory according to claim 1 wherein said means for switching includes an electromagnetic radiation absorbing substance integral with said plurality of information storage regions, and, means for immersing said storage element in a magnetic field and aligning said magnetic field in one of two mutually orthogonal directions.

40. An optical memory according to claim 1 wherein said means for switching includes an electromagnetic radiation absorbing substance integral with said plurality of information storage regions, and, means for immersing said storage element in an electric field and aligning said electric field in one of two mutually orthogonal directions.

41. An optical memory according to claim 1 wherein said means for switching includes an electromagnetic radiation absorbing substance integral with said plurality of information storage regions, and, means for selecting said at least one of said storage regions.

42. An optical memory according to claim 1 wherein said means for switching includes an electromagnetic radiation absorbing substance integral with said plurality of information storage regions, means for immersing said storage element in a magnetic field and aligning said field in one of two mutually orthogonal directions, and, means for projecting circularly polarized electromagnetic radiation of said given wavelength of a circular polarization opposite to that of said incident circularly polarized electromagnetic radiation at said information storage element.

43. An optical memory according to claim 1 wherein said means for switching includes an electromagnetic radiation absorbing substance integral with said plurality of information storage regions, means for immersing said storage element in a magnetic field and aligning said magnetic field in one of two mutually orthogonal directions, and, means for projecting circularly polarized electromagnetic radiation of said given wavelength of a circular polarization opposite to that of said incident circularly polarized electromagnetic radiation at said information storage element.

44. An optical memory according to claim 1 wherein said means for switching includes an electromagnetic radiation absorbing substance integral with said plurality of information storage regions, means for immersing said storage element in an electric field and aligning said electric field in one of two mutually orthogonal directions, and, means for projecting circularly polarized electromagnetic radiation of said given wavelength of a circular polarization opposite to that of said incident circularly polarized electromagnetic radiation at said information storage element.

45. An optical memory according to claim 1 wherein said means for switching includes an electromagnetic radiation absorbing substance integral with said plurality of information storage regions, means for immersing said storage element in a field and aligning said field in one of two mutually orthogonal directions, and, means for selecting said at least one of said storage regions.

46. An optical memory according to claim 1 wherein said means for switching includes an electromagnetic radiation absorbing substance integral with said plurality of information storage regions, means for immersing said storage element in a magnetic field and aligning said magnetic field in one of two mutually orthogonal directions, and, means for selecting said at least one of said storage regions.

47. An optical memory according to claim 1 wherein said means for switching includes an electromagnetic radiation absorbing substance integral with said plurality of information storage regions, means for immersing said storage element in an electric field and aligning said electric field in one of two mutually orthogonal directions, and, means for selecting said at least one of said storage regions.

48. An optical memory according to claim 1 wherein said means for switching includes an electromagnetic radiation absorbing substance integral with said plurality of information storage regions, means for projecting circularly polarized electromagnetic radiation of said given wavelength of a circular polarization opposite to that of said incident circularly polarized electromagnetic radiation at said information storage element, and, means for selecting said at least one of said storage regions.

49. An optical memory according to claim 1 wherein said means for switching includes an electromagnetic radiation absorbing substance integral with said plurality of information storage regions, means for immersing said storage element in a field and aligning said field in one of two mutually orthogonal directions, means for projecting circularly polarized electromagnetic radiation of said given wavelength of a circular polarization opposite to that of said incident circularly polarized electromagnetic radiation at said information storage element, and, means for selecting said at least one of said storage regions.

50. An optical memory according to claim 1 wherein said means for switching includes an electromagnetic radiation absorbing substance integral with said plurality of information storage regions, means for immersing said storage element in a magnetic field and aligning said magnetic field in one of two mutually orthogonal directions, means for projecting circularly polarized electromagnetic radiation of said given wavelength of a circular polarization opposite to that of said incident circularly polarized electromagnetic radiation at said information storage element, and, means for selecting said at least one of said storage regions.

51. An optical memory according to claim 1 wherein said means for switching includes an electromagnetic radiation absorbing substance integral with said plurality of information storage regions, means for immersing said storage element in an electric field and aligning said electric field in one of two mutually orthogonal directions, means for projecting circularly polarized electromagnetic radiation of said given wavelength of a circular polarization opposite to that of said incident circularly polarized electromagnetic radiation at said information storage element, and, means for selecting said at least one of said storage regions.

52. An optical memory according to claim 2 wherein said means for detecting a reflection includes a solid state detector of said electromagnetic radiation at said given wavelength.

53. An optical memory according to claim 2 wherein said means for detecting a reflection includes a detector of said electromagnetic radiation at said given wavelength.

54. An optical memory according to claim 3 wherein said means for projecting includes at least a source of electromagnetic radiation which projects circularly polarized electromagnetic radiation.

55. An optical memory according to claim 3 wherein said means for projecting includes at least a source of electromagnetic radiation having an energy output sufficient to permit nondestructive reflection of said incident circularly polarized electromagnetic radiation.

56. An optical memory according to claim 3 wherein said means for projecting includes at least a source of electromagnetic radiation which projects unpolarized electromagnetic radiation.

57. An optical memory according to claim 3 wherein said means for projecting includes a source of electromagnetic radiation which projects unpolarized electromagnetic radiation and means for converting said unpolarized radiation to circularly polarized radiation.

58. An optical memory according to claim 2 wherein said means for projecting includes a solid state source of said electromagnetic radiation.

59. An optical memory according to claim 3 wherein said means for projecting includes a laser.

60. An optical memory according to claim 3 wherein said means for projecting includes a solid state laser.

61. An optical memory according to claim 3 wherein said means for projecting includes a laser which provides unpolarized electromagnetic radiation and means for converting said unpolarized radiation to one of two circular polarizations.

62. An optical memory according to claim 3 wherein said means for projecting includes means for focusing said electromagnetic radiation on said at least one of said storage regions.

63. An optical memory according to claim 4 wherein said means for selecting includes means for applying relative motion between said electromagnetic radiation and said information storage element.

64. An optical memory according to claim 4 wherein said means for selecting includes means for applying rotary motion to said information storage elements.

65. An optical memory according to claim 16 wherein said radiation absorbing medium is a dye polymer which is absorptive at said given wavelength.

66. An optical memory according to claim 16 wherein said radiation absorbing medium is a medium which converts electromagnetic radiation at said given wavelength to heat.

67. An optical memory according to claim 18 wherein said means for immersing and aligning includes a pair of orthogonally arranged solenoids disposed around said information storage element.

68. An optical memory according to claim 18 wherein said means for immersing and aligning includes a pair of orthogonally arranged electrodes disposed around said information storage elements.

69. An optical memory according to claim 20 wherein said another means for projecting includes at least a source of electromagnetic radiation having an energy output at said given wavelength sufficient to cause heating of said at least an information storage region above its glass transition temperature.

70. An optical memory according to claim 20 wherein said another means for projecting includes at least a source of electromagnetic radiation which projects circularly polarized electromagnetic radiation.

71. An optical memory according to claim 20 wherein said another means for projecting includes a solid state source of said electromagnetic radiation.

72. An optical memory according to claim 20 wherein said another means for projecting includes a laser.

73. An optical memory according to claim 20 wherein said another means for projecting includes a solid state laser.

74. An optical memory according to claim 20 wherein said another means for projecting includes a laser which provides unpolarized electromagnetic radiation and means for converting said unpolarized radiation to one of two circular polarizations.

75. An optical memory according to claim 20 wherein said another means for projecting includes a source of electromagnetic radiation which provides unpolarized electromagnetic radiation and means for converting said unpolarized radiation to circularly polarized radiation.

76. An optical memory according to claim 20 wherein said another means for projecting includes means for focusing said electromagnetic radiation on said at least one of said information storage regions.

77. An optical memory according to claim 20 wherein said means for selecting includes means for applying relative motion between said electromagnetic radiation and said information storage element.

78. An optical memory element according to claim 21 wherein said means for selecting includes means for applying rotary motion to said information storage element.

79. An optical memory element according to claim 37 wherein said electromagnetic radiation absorbing substance is a dye polymer which is absorptive at said given wavelength.

80. An optical memory element according to claim 37 wherein said electromagnetic radiation absorbing substance is a substance which converts said electromagnetic radiation at said given wavelength to heat.

81. An optical memory element according to claim 37 wherein said electromagnetic radiation absorbing substance is a cholesteric liquid crystalline polysiloxane having approximately 10% benzophenone disposed therein.

82. An optical memory element according to claim 37 wherein said electromagnetic radiation absorbing substance is a cholesteric liquid crystalline polysiloxane having carbon black in concentrations in a range of 0.5% to 1% disposed therein.

83. A memory cell comprising a cholesteric liquid crystal which is reflecting to incident circularly polarized electromagnetic radiation at a given wavelength, and, means for reversibly altering said crystal to change said crystal from reflecting to transparent to said incident electromagnetic radiation.

84. A memory cell according to claim 83 wherein said given wavelength is in the visible range.

85. A memory cell according to claim 83 wherein said given wavelength is in a range of 300 nm to 14,600 nm.

86. A memory cell according to claim 83 wherein said means for reversibly altering includes an electromagnetic radiation absorbing medium disposed in thermally conductive contact with a surface of said crystal.

87. A memory cell according to claim 83 wherein said means for reversibly altering includes an electromagnetic radiation absorbing substance integral with said crystal.

88. A memory cell according to claim 83 wherein said means for reversibly altering includes means for immersing said crystal in a field and aligning said field in one of two mutually orthogonal directions.

89. A memory cell according to claim 83 wherein said means for reversibly altering includes means for immersing said crystal in a magnetic field and aligning said magnetic field in one of two mutually orthogonal directions.

90. A memory cell according to claim 83 wherein said means for reversibly altering includes means for immersing said crystal in an electric field and aligning said electric field in one of two mutually orthogonal directions.

91. A memory cell according to claim 83 wherein said means for reversibly altering includes means for projecting circularly polarized electromagnetic radiation of said given wavelength of a circular polarization opposite to that of said incident circularly polarized electromagnetic radiation at said crystal.

92. A memory cell according to claim 86 further including means for immersing said crystal in a field and aligning said field in one of two mutually orthogonal directions.

93. A memory cell according to claim 86 further including means for immersing said crystal in a magnetic field and aligning said magnetic field in one of two mutually orthogonal directions.

94. A memory cell according to claim 86 further including means for immersing said crystal in an electric field and aligning said electric field in one of two mutually orthogonal directions.

95. A memory cell according to claim 86 wherein said radiation absorbing medium is a dye polymer which is absorptive at said given wavelength.

96. A memory cell according to claim 87 further including means for immersing said crystal in a field and aligning said field in one of two mutually orthogonal directions.

97. A memory cell according to claim 87 further including means for immersing said crystal in a magnetic field and aligning said magnetic field in one of two mutually orthogonal directions.

98. A memory cell according to claim 87 further including means for immersing said crystal in an electric field and aligning said electric field in one of two mutually orthogonal directions.

99. A memory cell according to claim 87 wherein said radiation absorbing substance is a dye polymer which is absorptive at said given wavelength.

100. A memory cell according to claim 91 wherein said means for projecting includes a source of electromagnetic radiation having an energy output at said given wavelength sufficient to cause heating of said crystal above its glare transition temperature.

101. A memory cell according to claim 91 wherein said means for projecting includes a laser.

102. A memory cell according to claim 91 wherein said means for projecting includes a semiconductor laser.

103. A memory cell according to claim 95 wherein said electromagnetic radiation absorbing medium is a cholesteric liquid crystalline polysiloxane having approximately 10% benzophenone disposed therein.

104. A memory cell according to claim 95 wherein said electromagnetic radiation absorbing substance in a cholesteric liquid crystalline polysiloxane having carbon black in concentration in the range of 0.5% to 1% disposed therein.

105. A memory cell according to claim 96 wherein said means for reversibly altering includes means for projecting circularly polarized electromagnetic radiation of said given wavelength of a circular polarization opposite to that of said incident circularly polarized electromagnetic radiation at said crystal.

106. A memory cell according to claim 99 wherein said electromagnetic radiation absorbing medium is a cholesteric liquid crystalline polysiloxane having approximately 10% benzophenone disposed therein.

107. A memory cell according to claim 99 wherein said electromagnetic radiation absorbing medium is a cholesteric liquid crystalline polysiloxane having carbon black in concentrations in a range of 0.5% to 1% disposed therein.

108. An optical memory comprising a plurality of information storage elements each of which includes a plurality of information storage regions at least one which is reflecting to a given circular polarization of incident electromagnetic radiation, said at least one of said storage regions of one of said plurality of storage elements being reflecting at one of a plurality of wavelengths of said incident electromagnetic radiation and at least one of said storage regions of another of said plurality of storage elements being reflecting at another of said plurality of wavelengths of incident electromagnetic radiation, and, means for projecting said plurality of wavelength of incident electromagnetic radiation at said plurality of information storage elements to provide reflections from said storage regions.

109. An optical memory according to claim 108 further including a means for detecting said reflections from said storage regions.

110. An optical memory according to claim 108 further including means associated with each of said memory elements for changing at least a selected one of said storage regions from a reflecting condition to a transmitting condition and from a transmitting condition to a reflecting condition.

111. An optical memory according to claim 110 wherein said plurality of wavelengths of electromagnetic radiation are in the visible range.

112. An optical memory according to claim 110 wherein said plurality of wavelength of electromagnetic radiation are in a range of 400 nm to 11,600 nm.

113. An optical memory according to claim 110 wherein said given circular polarization is right-hand circular polarization.

114. An optical memory according to claim 110 wherein said given circular polarization is left-hand circular polarization.

115. An optical memory according to claim 110 wherein each of said information storage elements further includes a support substrate on which said information storage regions are disposed.

116. An optical memory according to claim 110 wherein each of said information storage elements is a member in which said information storage regions are disposed.

117. An optical memory according to claim 110 wherein each of said information storage regions is a cholesteric liquid crystal region.

118. An optical memory according to claim 110 wherein information storage regions other than said at least one of said information storage regions are transparent to said plurality of wavelengths of incident electromagnetic radiation.

119. An optical memory according to claim 110 wherein said means for projecting includes at least a single laser.

120. An optical memory according to claim 110 wherein said means for projecting includes a tunable laser.

121. An optical memory according to claim 110 wherein said means for projecting includes a plurality of lasers each of which is at a wavelength within said plurality of wavelengths of incident electromagnetic radiation.

122. An optical memory according to claim 110 wherein said means for projecting is a source of said electromagnetic radiation which is unpolarized.

123. An optical memory according to claim 110 wherein said means for projecting includes a source of circularly polarized electromagnetic radiation.

124. An optical memory according to claim 110 wherein said plurality of information storage regions includes a further plurality of information storage regions disposed in alignment with said plurality of information storage regions at least one of said further plurality of information storage regions being aligned with said at least one of said storage regions, said at least one of said further plurality of storage regions being reflecting to a circular polarization opposite to said given circular polarization.

125. An optical memory according to claim 110 wherein said plurality of information storage regions includes a further plurality of information storage regions aligned with said plurality of information storage regions at least one of said further plurality of information storage regions being aligned with said at least one of said storage regions, said at least one of said further plurality of storage regions being reflecting to said given circular polarization, and a plate of thickness equal to one-half the wavelength of one of said plurality of wavelengths of electromagnetic radiation sandwiched between said plurality and said further plurality of information storage regions.

126. An optical memory according to claim 110 further including means for detecting reflections from said storage regions.

* * * * *